Figure 1:
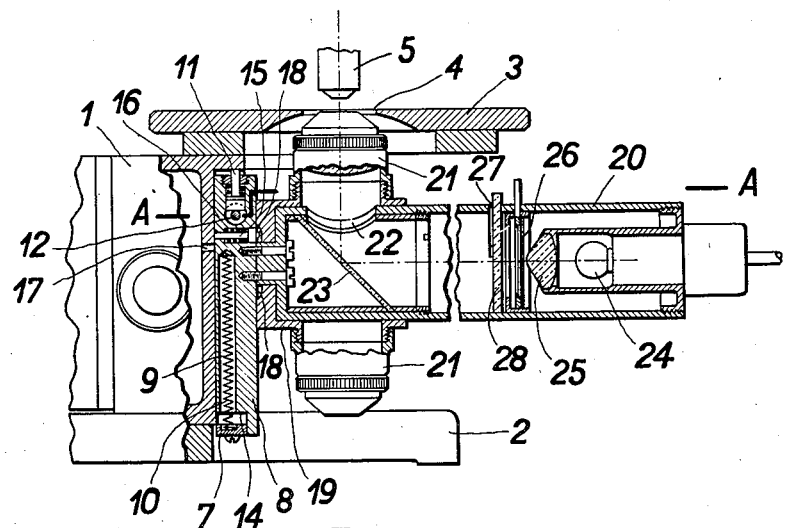

March 26, 1935. W. BAUERSFELD 1,995,599

ILLUMINATING DEVICE FOR MICROSCOPES

Filed Oct. 17, 1934

Inventor:

Walther Bauersfeld

Patented Mar. 26, 1935

1,995,599

UNITED STATES PATENT OFFICE 1,995,599

ILLUMINATING DEVICE FOR MICROSCOPES

Walther Bauersfeld, Jena, Germany, assignor to the firm Carl Zeiss, Jena, Germany Application October 17, 1934, Serial No. 748,679
In Germany October 17, 1933

9 Claims. (Cl. 88—40)

As a rule, the apertures of the pencils of imaging rays received by different microscope objectives have different dimensions, and changing to the observation or projection by means of another objective very often requires a change of the condenser for the illumination of the object, because the aperture of the pencil of illumination rays is to correspond to the one of the microscope objective. With a view to simplifying this change, it has been suggested to mount the different condensers in question in a revolving piece by means of which the condensers required in each instance can be placed in the path of the illuminating rays by a simple manipulation and without any loss of time. The axis of rotation of the revolving piece is in this case parallel to the optical axis of the microscope objective.

The invention concerns a device for the illumination of objects in transmitted light in microscopes having a revolving piece for a plurality of condensers to be used alternately. This device is especially advantageous as compared to the known devices of this kind, because it does not require any change in the construction of the usual microscopes and because it is very easy to combine the revolving piece with the source of light itself and the appertaining elements, for instance lamp condenser, diaphragm, light filtre, to a self-contained and handy instrument. This improvement can be obtained by providing that, according to the invention, the axis of rotation of the revolving piece is at right angles to the optical axis of the microscope objective and that the optical axes of the condensers lie in the plane determined by the optical axis of the microscope objective and at right angles to the said axis of rotation. The revolving piece is conveniently displaceable parallel to the optical axis of the microscope objective, so that use may be made also of condensers which have comparatively large apertures and whose light exit surface is to lie during the observation very near the object plane. These condensers therefore protrude into the illumination aperture in the object stage, and rotating the revolving piece does consequently not entail the disadvantage of these condensers striking the object stage. The illumination device merely requires to be so constructed that the revolving piece is kept by a spring in the position for use determined by a stop and is to be displaced from the said position against the action of the spring only when a change of condenser is to be effected. When the said stop is adjustable, the final position of the converging point of the illumination rays may be so adjusted by means of the stop as to correspond to different thicknesses of object carriers.

As mentioned above, care is to be taken that the illumination device is protected against injuries by knocks against the microscope, which may arise when the revolving piece is rotated. On the other hand, the used condenser is to remain in its exact position when an observation is made. To meet these requirements, the illumination device is improved in the following manner. The device may be provided with a locking organ which prevents the revolving piece from rotating in its position for use determined by the stop. The revolving piece may be further protected by means of a locking organ against such displacements in the position opposite the position for use when it assumes on the stationary part holding it a position in which each of the condenser axes includes an angle with the optical axis of the microscope objective and does not coincide with this axis. This construction of the illumination device may be specially simplified by using for both the said locking processes only one locking organ, this organ locking the one lock when the other is released.

Figure 2:
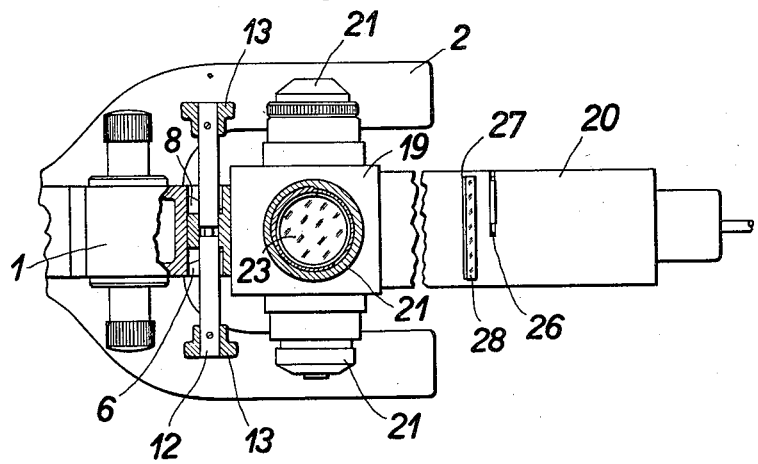

In the accompanying drawing, which represents a constructional example of the invention, Figure 1 is a central elevational section and Figure 2 shows a top view in a section through line A—A in Figure 1.

The illumination device according to the constructional example is assumed to be provided on a microscope of the usual construction. This microscope is indicated by part of its stand 1, which rests on a foot 2 and carries an object stage 3. This object stage is provided with an aperture 4 for the passage of light. Above the aperture 4 is disposed the imaging system of the microscope, namely an objective 5. To the stand 1 is cast a slide guide 6 whose lower end is covered by a plate 7 and whose guiding direction is parallel to the optical axis of the objective 5. A slide 8, which is displaceable in the slide guide 6, has a bore 9 parallel to the guide 6 and containing a pressure spring 10. This spring 10, which rests against the plate 7, presses the slide 8 upwardly. The slide movement effected by the spring 10 is limited by a stop 11 lying against an eccentric shaft 12 which is provided with milled heads 13 and mounted in the slide 8. The slide 8 has a stop surface 14 which, when the slide is displaced against the action of the spring 10, lies against the plate 7 and thus checks the downward movement of the slide. Transversely to the direction of displacement of the slide 8, a catch 15 is so mounted as to be displaceable against the pressure of a spring 16. The microscope stand 1 has a bore 17. The catch 15 is influenced by the spring 16 in such a manner as to extend into one of four notches distributed in the periphery of a sleeve 19 which is rotatably mounted on a cylindrical lamp housing 20 screwed to the slide 8. The axis of the lamp housing 20 intersects the optical axis of the microscope objective at right angles. Four microscope condensers 21 are so screwed into the periphery of the sleeve 19 that their axes lie in that plane which is at right angles to the axis of the lamp housing 20 and which is determined by the optical axis of the microscope objective, and that the axis of one of these condensers 21 coincides with the optical axis of the microscope objective when the catch 15 extends into the corresponding notch 18. The lamp housing 20 has a lateral light exit aperture 22 which is coordinated to a plane reflector 23 inclined at 45° relatively to the axis of the objective 5. An incandescent lamp 24 and a lamp condenser 25 are provided in the end of the lamp housing 20. Behind this lamp condenser 25 are disposed an iris diaphragm 26, which is mounted in the lamp housing 20, and a slit 27 for placing a light filtre 28 in the path of the illuminating rays.

When using the illuminating device, the incandescent lamp 24 is connected to a suitable electric main. The necessary restriction of the pencil of light emanating from the lamp condenser 25 is effected by changing the diaphragm aperture of the iris diaphragm 26, which serves as a light field diaphragm. Subsequently to having traversed the eventually used filtre 28, the light is directed to the reflector 23, whence the light is deviated to the light exit aperture 22 through which it enters the condenser 21 above this aperture. By pressing the lamp housing 20 or the eccentric shaft 12 downwardly, the slide 8 is lowered to such an extent that the surface 14 lies against the plate 7 and that the catch 15 is consequently opposite the bore 17. By rotating the sleeve 19 by hand, the condenser 21 corresponding to the used objective 5 is turned upwardly, and the catch 15 is pressed against the action of the spring 16 into the bore 17, provided that none of the notches 18 is opposite the catch 15 or, in other words, that none of the axes of the condensers 21 coincides with the axis of the microscope objective. The spring 10 can therefore move the slide 8 upwardly only when one of the condensers 21 assumes the position for use, it being thus avoided that the condenser 21, which generally extends in its position for use into the stage aperture 4, strikes against the edge of this aperture 4, and is consequently damaged, when moving upwardly. As soon as the axis of the upper condenser 21 coincides with the optical axis of the microscope, the corresponding notch 18 is opposite the catch 15, which is now so influenced by the spring 16 as to catch in this notch and to secure the sleeve 19 against rotation about the lamp housing 20. As the locking of the slide movement is consequently neutralized, the slide 8 is displaced upwardly in its guide 6 according to the pressure of the spring 10 until the stop 11 is arrested by the stand 1. The stop 11 is to be given such a length that the upper condenser 21 assumes its correct position relative to the object stage 3 when the said stop 11 is arrested. Small variations of the height of the condenser 21, which are eventually necessary with a view to adapting the height of the converging point of the light rays to different thicknesses of object carriers, can be effected by rotating the eccentric shaft 12, this rotation entailing that the stop 11 protrudes from the slide 8 more or less. When another objective 5 is to be used for the microscopic observation, and when it is necessary to place another condenser 21 into the path of the illuminating rays, the described process is to be repeated.

I claim:

1. A microscope comprising a stand, an object stage provided with an aperture for the passage of light, a microscope objective, a changing device, a plurality of microscope condensers attached to this changing device, and an illumination device, the said changing device consisting of a part connected to the said stand and another part rotatable about an axis and mounted on the first said part, this axis being at right angles to the optical axis of the said microscope objective, the optical axes of the said microscope condensers lying in that plane at right angles to the said axis of rotation in which the optical axis of the said microscope objective lies.

2. A microscope comprising a stand, an object stage provided with an aperture for the passage of light, a microscope objective, a changing device, a plurality of microscope condensers attached to this changing device, and an illumination device, the said changing device consisting of a part connected to the said stand and another part rotatable about an axis and mounted on the first said part, the said illumination device being disposed in that part of the said changing device which is connected to the stand and consisting of a source of light, a lamp condenser and a plane reflector, the axis of rotation of the rotatable part of the said changing device being at right angles to the optical axis of the said microscope objective, the optical axes of the said microscope condensers lying in that plane at right angles to the said axis of rotation in which the optical axis of the said microscope objective lies, and the said plane reflector being inclined at an angle of 45° relatively to the said axis of rotation.

3. In a microscope according to claim 2, the said illumination device having a variable diaphragm.

4. In a microscope according to claim 2, the said illumination device being provided with a removable light filtre.

5. A microscope comprising a stand, an object stage provided with an aperture for the passage of light, a microscope objective, a changing device, a plurality of microscope condensers attached to this changing device, an illumination device, the said changing device consisting of a part connected to the said stand and another part rotatable about an axis and mounted on the first said part, means for displaceably mounting the said changing device on the said stand, the direction of displacement of this changing device being parallel to the optical axis of the said microscope objective, a stop limiting the upward displacements of this changing device relatively to the said stand, and means for holding this changing device automatically in its topmost position, the axis of rotation of the rotatable part of the said changing device being at right angles to the optical axis of the said microscope objective, the optical axes of the said microscope condensers lying in that plane at right angles to the said axis of rotation in which the optical axis of the said microscope objective lies.

6. In a microscope according to claim 5, the said stop being adjustable.

7. A microscope comprising a stand, an object stage provided with an aperture for the passage of light, a microscope objective, a changing device, a plurality of microscope condensers attached to this changing device, an illumination device, the said changing device consisting of a part connected to the said stand and another part rotatable about an axis and mounted on the first said part, means for displaceably mounting the said changing device on the said stand, the direction of displacement of this changing device being parallel to the optical axis of the said microscope objective, a stop limiting the upward displacements of the said changing device relatively to the said stand, means for automatically holding this changing device in its topmost position, and means for automatically holding the rotatable part of this changing device in an unchangeable position to the part connected to the said stand and this when the changing device is at its topmost position, the axis of rotation of the said rotatable part being at right angles to the optical axis of the said microscope objective, the optical axes of the said microscope condensers lying in that plane at right angles to the said axis of rotation in which the optical axis of the said microscope objective lies.

8. A microscope comprising a stand, an object stage provided with an aperture for the passage of light, a microscope objective, a changing device, a plurality of microscope condensers attached to this changing device, an illumination device, the said changing device consisting of a part connected to the said stand and another part rotatable about an axis and mounted on the first said part, means for displaceably mounting the said changing device on the said stand, the direction of displacement of this changing device being parallel to the optical axis of the said microscope objective, a stop limiting the upward displacements of the said changing device relatively to the said stand, and means for automatically holding this changing device in its lowest position, the axis of rotation of the rotatable part of the said changing device being at right angles to the optical axis of the said microscope objective, the optical axes of the said microscope condensers lying in that plane at right angles to the said axis of rotation in which the optical axis of the said microscope objective lies.

9. A microscope comprising a stand, an object stage provided with an aperture for the passage of light, a microscope objective, a changing device, a plurality of microscope condensers attached to this changing device, an illumination device, the said changing device consisting of a part connected to the said stand and another part rotatable about an axis and mounted on the first said part, means for displaceably mounting the said changing device on the said stand, the direction of displacement of this changing device being parallel to the optical axis of the said microscope objective, a stop limiting the upward displacements of the said changing device relatively to the said stand, a catch displaceably mounted in the said means for displaceably mounting the changing device, and a spring so acting upon this catch as to make this catch continuously touch the rotatable part of the said changing device, this rotatable part being provided with radial grooves and the said stand being provided with a notch, the said catch so cooperating with these grooves and this notch that the one end of the catch extends into one of the grooves when the changing device assumes its topmost position, and that the other end of the catch extends into the notch when the changing device assumes its lowest position and the optical axes of the said condensers are inclined relatively to the optical axis of the said microscope objective, the axis of rotation of the rotatable part of the said changing device being at right angles to the optical axis of the said microscope objective, the optical axes of the said microscope condensers lying in that plane at right angles to the said axis of rotation in which the optical axis of the said microscope objective lies.

WALTHER BAUERSFELD.